(12) United States Patent
Wijenberg et al.

(10) Patent No.: US 7,294,411 B2
(45) Date of Patent: Nov. 13, 2007

(54) BRAZING PRODUCT AND METHOD OF ITS MANUFACTURE

(75) Inventors: Jacques Hubert Olga Joseph Wijenberg, Amsterdam (NL); Adrianus Jacobus Witterbrood, Velserbroek (NL); Joop Nicolaas Mooij, Castricum (NL)

(73) Assignee: Aleris Aluminum Koblenz GmbH, Koblenz (DE)

( * ) Notice: Subject to any disclaimer, the term of this patent is extended or adjusted under 35 U.S.C. 154(b) by 670 days.

(21) Appl. No.: 10/622,122

(22) Filed: Jul. 18, 2003

(65) Prior Publication Data

US 2006/0121306 A1    Jun. 8, 2006

Related U.S. Application Data

(63) Continuation-in-part of application No. 10/060,117, filed on Jan. 31, 2002, now Pat. No. 6,796,484.

(30) Foreign Application Priority Data

Jul. 24, 2002    (EP)    ................................ 02078053

(51) Int. Cl.
*B32B 15/20* (2006.01)
*B32B 15/01* (2006.01)
*B32B 15/04* (2006.01)
*C22F 1/10* (2006.01)
*C22F 1/043* (2006.01)
*B23K 35/34* (2006.01)
*B23K 103/10* (2006.01)

(52) U.S. Cl. ..................... 428/652; 428/654; 428/650; 148/528; 148/527; 148/535; 148/537; 228/262.31; 228/262.51

(58) Field of Classification Search .................... None
See application file for complete search history.

(56) References Cited

U.S. PATENT DOCUMENTS 2,745,799 A    5/1956    Patrie (Continued)

FOREIGN PATENT DOCUMENTS

CH    655134    12/1983

(Continued)

OTHER PUBLICATIONS

Bureau of Mines Technology, "Aluminium Soft-Soldering", 2301 N.T.I.S. Tech Notes (manufacturing), XP-002119816, 1985, Jan. No. 1G, Springfield, VA, pp. 12-13.

(Continued)

*Primary Examiner*—Jennifer McNeil
*Assistant Examiner*—Jason L. Savage
(74) *Attorney, Agent, or Firm*—Steven, Davis, Miller & Mosher, LLP

(57) ABSTRACT

The invention relates to a brazing sheet product comprising a core sheet, a clad layer on said core sheet made of an aluminum alloy containing silicon in an amount in the range of 4 to 14% by weight, an optional layer comprising nickel on the outersurface of said clad layer, and a diffusion layer comprising nickel-tin alloy on the outer surface of said nickel layer. The invention further relates to a method of manufacturing such a brazing product comprising the process step of plating different metal layers and subjecting the plated brazing product to an annealing treatment by holding the plated brazing product at a temperature in the range of 100 to 500° C. for a period of 1 sec. to 300 minutes to form a diffusion layer comprising nickel-tin alloy on the outer surface of said layer comprising nickel.

49 Claims, 1 Drawing Sheet

U.S. PATENT DOCUMENTS

| | | | |
|---|---|---|---|
| 2,821,014 A | 1/1958 | Miller |
| 2,821,505 A | 1/1958 | Beach |
| 3,482,305 A | 12/1969 | Dockus et al. |
| 3,489,657 A | 1/1970 | Brenan et al. |
| 3,597,658 A | 8/1971 | Rivera |
| 3,692,583 A | 9/1972 | Mucenieks et al. |
| 3,862,018 A | 1/1975 | Mentone |
| 3,881,999 A | 5/1975 | Toth et al. |
| 3,896,009 A | 7/1975 | Kobayashi et al. |
| 3,963,454 A | 6/1976 | Singleton, Jr. |
| 3,970,237 A | 7/1976 | Dockus |
| 4,028,200 A | 6/1977 | Dockus |
| 4,097,342 A | 6/1978 | Cooke et al. |
| 4,126,522 A | 11/1978 | Edlund |
| 4,157,154 A | 6/1979 | Scott et al. |
| 4,164,454 A | 8/1979 | Schober |
| 4,177,325 A | 12/1979 | Roberts et al. |
| 4,346,128 A | 8/1982 | Loch |
| 4,388,159 A | 6/1983 | Dockus et al. |
| 4,397,721 A | 8/1983 | Exalto et al. |
| 4,602,731 A | 7/1986 | Dockus |
| 4,721,653 A | 1/1988 | Oda et al. |
| 4,741,811 A | 5/1988 | Lefebvre et al. |
| 5,069,980 A | 12/1991 | Namba et al. |
| 5,234,574 A | 8/1993 | Tsuji et al. |
| 5,245,847 A | 9/1993 | Bando et al. |
| 5,246,565 A | 9/1993 | Mignardot |
| 5,422,191 A | 6/1995 | Childree |
| 5,466,360 A | 11/1995 | Ehrsam et al. |
| 5,601,695 A | 2/1997 | Muranushi |
| 5,643,434 A | 7/1997 | Benmalek et al. |
| 5,961,853 A | 10/1999 | Thornton |
| 5,997,721 A | 12/1999 | Limbach et al. |
| 6,060,174 A | 5/2000 | Sabol et al. |
| 6,129,262 A | 10/2000 | Cooper et al. |
| 6,165,630 A | 12/2000 | Gehlhaar et al. |
| 6,379,818 B1 | 4/2002 | Mooij et al. |
| 6,383,661 B2 | 5/2002 | Wittebrood et al. |
| 6,391,476 B2 | 5/2002 | Wittebrood et al. |
| 6,503,640 B2 | 1/2003 | Wittebrood et al. |
| 6,568,584 B2 | 5/2003 | Wittebrood et al. |
| 6,599,645 B2 | 7/2003 | Wittebrood |
| 2002/0088717 A1 | 7/2002 | Wittebrood et al. |
| 2002/0175205 A1 | 11/2002 | Wittebrood et al. |
| 2003/0042146 A1* | 3/2003 | Wijenberg et al. ......... 205/210 |
| 2003/0064242 A1 | 4/2003 | Wittebrood et al. |
| 2003/0091856 A1 | 5/2003 | Wittebrood et al. |
| 2003/0098338 A1 | 5/2003 | Dockus et al. |
| 2003/0155409 A1 | 8/2003 | Dockus et al. |
| 2003/0189082 A1 | 10/2003 | Dockus et al. |
| 2003/0197050 A1 | 10/2003 | Graham et al. |
| 2004/0115468 A1* | 6/2004 | Wijenberg et al. .......... 428/647 |

FOREIGN PATENT DOCUMENTS

| | | |
|---|---|---|
| DE | 3821073 | 1/1989 |
| EP | 0227261 | 7/1987 |
| EP | 795048 | 6/1996 |
| FR | 2354171 | 1/1978 |
| FR | 2617868 | 1/1989 |
| GB | 1176688 | 1/1970 |
| GB | 2000525 | 1/1979 |
| JP | 54013430 | 1/1979 |
| JP | 5106059 | 4/1993 |
| JP | 11097298 | 4/1999 |
| WO | 9743467 | 11/1997 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 02086197 | 10/2002 |
| WO | 030443777 | 5/2003 |
| WO | 03045618 | 6/2003 |
| WO | 03045619 | 6/2003 |

OTHER PUBLICATIONS

Wernick and Pinner, "The Surface Treatment and Finishing of Aluminium and its Alloys", 5th edition, vol. 1, pp. 181-182 and pp. 191-203 (1988).

Wernick and Pinner, "The Surface Treatment and Finishing of Aluminium and its Alloys", 5th edition, vol. 2, pp. 1006-1022 and pp. 1023-1071 (Ch. 14-15)(Nov. 1988).

SAE Paper No. 880446 by B.E. Cheadle and K.F. Dockus, "Inert Atmosphere Fluxless Brazing of Aluminium Heat Exchangers", ICE, Detroit, Michigan, pp. 1-11 (Feb. 29-Mar. 4, 1988).

Adrianus Jacobus Wittebrood, Jacques Hubert Olga Joseph Wijenberg, Joop Nicolaas Mooji, "Nickel-Plated Aluminium Brazing Sheet" Research Disclosure, No. 439, pp. 1946-1947 (Nov. 2000).

SAE Paper No. P-263 by Kent Schölin and Bo Mannerskog, "Corrosion Resistant Aluminium Radiator Materials for Vacuum and Controlled Atmosphere Brazing" pp. 75-82, 1993 Vehicle Thermal Management Systems Conference Proceedings.

Greef, N. et al, "The Hydrogen Evolution Reaction", Instrumental Methods in Electrochemistry, pp. 233-236 (1990).

Wijenberg et al., filed Jul. 18, 2003, U.S. Appl. No. 10/621,601 (unpublished).

U.S. Appl. No. 10/732,448, Wittebrood et al., filed Dec. 11, 2003 (unpublished).

U.S. Appl. No. 10/732,405, Wittebrood et al., filed Dec. 11, 2003 (unpublished).

* cited by examiner

US 7,294,411 B2

BRAZING PRODUCT AND METHOD OF ITS MANUFACTURE

CROSS REFERENCE TO RELATED APPLICATION

This is a continuation-in-part under 35 USC Section 120 of U.S. patent application Ser. No. 10/060,117 to Wittebrood et al., filed Jan. 31, 2002 now U.S. Pat. No. 6,796,484.

FIELD OF INVENTION

The invention relates to a brazing product, such as a brazing sheet product, comprising an aluminum layer being made of an aluminum alloy comprising silicon in an amount in the range of 4 to 14% by weight, and a further layer comprising nickel on the outer surface of the AlSi-alloy layer, wherein taken together the aluminum layer and all layers exterior thereto form a filler metal for a brazing operation. The invention also relates to a method of manufacturing such a brazing product, and to a brazed assembly comprising at least one component made of this brazing product.

DESCRIPTION OF THE RELATED ART

Aluminum and aluminum alloys can be joined by a wide variety of brazing and soldering processes. Brazing, by definition, employs a filler metal or alloy having a liquidus above 450° C. and below the solidus of the base metal. Brazing is distinguished from soldering by the melting point of the filler metal: a solder melts below 450° C. Soldering processes are not within the field of the present invention.

Brazing products, and in particular brazing sheet products, find wide applications in heat exchangers and other similar equipment. Conventional brazing sheet products have a core or base sheet, typically an aluminum alloy of the Aluminum Association ("AA")3xxx-series, having on at least one surface of the core sheet an aluminum clad layer, the aluminum clad layer being made of an AA4xxx-series alloy comprising silicon in an amount in the range of 4 to 14% by weight, and preferably in the range of 7 to 14% by weight. The aluminum clad layer may be coupled to the core or base alloy in various ways known in the art, for example by means of roll bonding, cladding, explosive cladding, thermal spray-forming or semi-continuous or continuous casting processes.

Controlled Atmosphere Brazing ("CAB") and Vacuum Brazing ("VB") are the two main processes used for industrial scale aluminum brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the aluminum oxide layer present is mainly caused by the evaporation of magnesium from the clad alloy. There is always more magnesium present in the furnace than necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. A brazing flux for use in brazing aluminum alloys usually consist of mixtures of alkali earth chlorides and fluorides, sometimes containing aluminum fluoride or cryolite. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminum surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the known brazing flux application. Such a material can be supplied to a manufacturer of brazed assemblies and is ready to use directly after forming of the assembly parts. No additional brazing fluxing operations have to be carried out. Presently, only one process for fluxless brazing is used on an industrial scale. The material for this process can be for example standard brazing sheet made from an AA3xxx-series core alloy clad on one or both sides with a cladding of an AA4xxx-series alloy. Before the brazing sheet can be used the surface has to be modified in such a way that the naturally occurring aluminum oxide layer does not interfere during the brazing cycle. The method of achieving good brazing is to deposit a specific amount of nickel on the surface of the clad alloy. If properly applied, the nickel reacts, presumably exothermically, with the underlying aluminum. When electroplating is used the adherence of the nickel should be sufficient to withstand typical shaping operations being used in, for example, heat exchanger manufacture.

Processes for nickel-plating in an alkaline solution of aluminum brazing sheet are known from each of U.S. Pat. No. 3,970,237, U.S. Pat. No. 4,028,200, and U.S. Pat. No. 4,164,454. According to these documents, nickel or cobalt, or combinations thereof, are most preferably deposited in combination with lead. The lead addition is used to improve the wetteability of the aluminum clad alloy during the brazing cycle. An important characteristic of these plating processes is that the nickel is preferentially deposited on the silicon particles of the aluminum clad alloy. To obtain sufficient nickel for brazing, the surface of the aluminum clad alloy should contain a relatively large number of silicon particles to act as nuclei for the nickel deposition. It is believed that to obtain sufficient nucleation sites a part of the aluminum in which the silicon particles are embedded should be removed before pickling by chemical and/or mechanical pre-treatment. This is believed a necessary condition to obtain sufficient silicon coverage to serve as nuclei for the plating action of the brazing or clad alloy. On a microscopic scale the surface of the Si-containing cladding of the brazing sheet is covered with nickel-lead globules. However, the use of lead for the production of a suitable nickel and/or cobalt layer on brazing sheet has several disadvantages. The use of lead for manufacturing products, such as automotive products, is undesirable and it is envisaged that in the very near future there might possibly even be a ban on lead comprising products or products manufactured via one or more intermediate processing steps comprising lead or lead-based components.

The international PCT patent application no. WO-00/71784, J. N. Mooij et al., incorporated herein by reference in its entirety, discloses a brazing sheet product and a method of its manufacture. In this brazing sheet product there is provided a very thin bonding layer, preferably applied by plating, comprising zinc or tin between the AlSi-alloy clad layer and the nickel layer in order to improve the bonding of the nickel layer. The addition of lead to the nickel layer has been replaced by the addition of bismuth while maintaining the excellent brazeability characteristics of the brazing sheet product.

A drawback of the known brazing sheet products having a layer comprising nickel is the limited corrosion life of brazed products in a SWAAT-test in accordance with ASTM G-85. Corrosion lifetimes without perforations are typically in the range of 4 days and thereby restricting possible interesting applications of the brazing product. For several applications of the known nickel-plated brazing sheet in brazed products such a relatively short corrosion lifetime is not detrimental. However, a good corrosion resistance is considered a valuable property for brazing products used in, amongst other things, heat exchangers, such as radiators and condensers. These heat exchangers are exposed to a severe external corrosive attack by, e.g., de-icing road salt.

SUMMARY OF THE INVENTION

It is an object of the present invention to provide a Ni-plated brazing sheet product for use in a brazing operation, ideally a fluxless CAB brazing operation, and wherein the brazing sheet product has an improved post-braze corrosion resistance when measured in a SWAAT-test in accordance with ASTM G-85.

It is another object of the present invention to provide a brazing sheet product comprising a core sheet made of an aluminum alloy coupled on at least one surface of the core sheet to an aluminum clad layer (also known as an aluminum cladding), the aluminum clad layer being made of an aluminum alloy comprising silicon in an amount in the range of 4 to 14% by weight, and a further layer comprising nickel on the outer surface of the aluminum clad layer such that taken together the aluminum clad layer and all layers exterior thereto form a filler metal for a brazing operation, and wherein the brazing sheet product has an improved post-braze corrosion resistance when measured in a SWAAT-test in accordance with ASTM G-85.

It is a further object of the present invention to provide a method of manufacturing the brazing product, ideally in the form of a sheet product.

In accordance with the invention in one aspect there is provided a brazing sheet product comprising a core sheet, on at least one side of the core sheet a clad layer made of an aluminum alloy containing silicon in an amount in the range of 4 to 14% by weight, and on at least one outersurface of the clad layer a diffusion layer comprising nickel-tin alloy.

By the addition of tin as important alloying element to the filler metal in the appropriate mol-ratio with respect to the nickel an improved corrosion performance is being obtained of the brazing product in a post-braze condition. In the brazing product according to the invention post-braze corrosion lifetimes without perforations according to ASTM G-85 exceed 7 days. The product can be fluxless brazed under controlled atmosphere conditions in the absence of a brazing flux material while achieving very good post-braze corrosion performance enhancing the possibilities of application of the Ni-plated brazing product.

The invention is based in part on the insight that it is believed that the cathodic reaction governs the overall corrosion rate of Ni-plated brazing products when tested in the SWAAT-test in accordance with ASTM G-85. It is speculated that the cathodic reaction in this system appears to be the Hydrogen Evolution Reaction ("HER"). When Ni-plated brazing products such as brazing sheets are being subjected to a brazing operation, typically a fluxless CAB operation, small Ni-aluminide particles are being formed which are believed to catalyse the HER. By the addition of tin in a sufficient amount to the metal filler and having a lower exchange current density for the HER as compared to nickel-aluminides the catalyst effect is reduced and the post-braze corrosion performance of the brazed product is improved remarkably.

It is believed that an upper layer of pure tin metal is sensitive to progressive oxidation in pre-braze conditions under humid conditions, e.g. during transport of a plated coil to a customer. The surface oxides formed adversely influence the brazing process. By providing the tin required to improve the post-braze corrosion performance in the form of a nickel-tin diffusion layer, preferably obtained by a diffusion annealing treatment, no free tin is available anymore and thereby the occurrence of the detrimental progressive oxidation of the tin is avoided. It has been found that a Ni—Sn alloy layer forms a thin stable surface oxide film in air.

Preferably, between the Ni—Sn alloy diffusion layer and the clad layer there is present a layer of nickel or nickel-alloy, preferably lead-free from an environmental point of view, to initiate the reaction, presumably exothermic, with the underlying AlSi-alloy during the brazing operation. This reaction does not occur, or at least to a significant lesser extent, if alloying elements such as tin in a too high an amount are present. Therefore, the nickel layer between the clad layer and the Ni—Sn alloy diffusion layer comprises of 96% by weight or more of nickel, and is preferably tin-free. The thickness of this nickel layer does not need to be very large, and is preferably 0.4 micron at most. The thin layer of nickel or nickel-alloy may optionally contain bismuth as an alloying element in a range of up to 4% by weight to lower the surface tension of the molten filler metal during a brazing operation.

In an embodiment of the brazing sheet product the AlSi-alloy clad layer and all layers exterior thereto form the metal filler for a brazing operation and have a composition with the proviso that the mol-ratio of Ni:Sn is in the range of 10:(0.5 to 9), and preferably in the range of 10:(0.5 to 6). When the mol-ratio is too low no significant improvement in the post-braze corrosion life may be found. It has been found that if the mol-ratio becomes more than 10:6, than the brazeability becomes less efficient, while at a mol-ratio of more than 10:9 the brazeability becomes very poor.

An embodiment of the brazing sheet product according to the invention is further characterized by an optional thin layer comprising zinc as an intermediate bonding layer between the outer surface of the AlSi-alloy clad layer and the thin layer comprising nickel or nickel-alloy. With the zinc comprising intermediate bonding layer a very effective bond between the AlSi-alloy clad layer and the thin layer comprising nickel is formed, the bond remaining effective during subsequent deformation of the brazing product, for example in a bending operation. Preferably the intermediate bonding layer has a thickness of at most 0.5 μm, more preferably at most 0.3 μm (300 nm), and most preferably in the range of 0.01 to 0.15 μm (10-150 nm). In the best results obtained a thickness of about 30 nm has been used. It has been found that the thin bonding layer of zinc has no detrimental effect on the post-braze corrosion performance of the product according to the invention.

In an embodiment of the brazing sheet product the core sheet is an aluminum alloy, and is preferably of an AA3xxx, or AA5xxx, or AA6xxx-series aluminum alloy.

In accordance with the invention in another aspect there is provided a method of manufacturing an aluminum brazing product, which method comprises the steps of: (a) providing an aluminum base substrate of an aluminum alloy comprising silicon in an amount in the range of 4 to 14% by weight, (b) plating a metal layer comprising nickel or nickel alloy onto at least one outersurface of the aluminum base substrate, (c) plating a further metal layer comprising tin or tin-alloy onto the outersurface of the layer comprising nickel or nickel alloy, and (d) subjecting the plated brazing product to an annealing treatment by holding the plated brazing product at a temperature in the range of 100 to 500° C. for a period of 1 sec. to 300 minutes to form a diffusion layer comprising nickel-tin alloy.

The annealing treatment achieves the effect that the applied tin layer diffuses into the applied nickel layer to form a Ni—Sn alloy layer. It is believed that an upper layer of pure tin metal is sensitive to progressive oxidation in pre-braze conditions under humid conditions. The surface oxides formed adversely influence the brazing process. By providing the tin required to improve the post-braze corrosion performance in the form of a nickel-tin diffusion layer essentially no free tin is available anymore, and thereby the occurrence of the detrimental progressive oxidation of the tin is avoided. It has been found that a Ni—Sn alloy layer forms a thin stable surface oxide film in air. Further oxidation in air takes place essentially only at temperatures above about 320° C. Further oxidation in air is substantially avoided at temperatures below about 320° C.

The melting point of tin is about 232° C. The annealing treatment may be carried out below the melting temperature of tin, but requiring prolonged soaking time up to 300 minutes. The annealing treatment may be carried out also above the melting temperature of tin, for example at about 250° C. or about 300° C., whereby the tin diffuses into the solid nickel or nickel-alloy layer. Preferred annealing treatments are at a temperature in a range of 230 to 350° C. for a soaking time of 1 sec. to 600 sec., and more preferably 1 sec. to 300 sec.

The annealing treatment is preferably carried out in a protective environment preventing the oxidation of tin or tin-alloy, such as a dry air atmosphere, or nitrogen gas atmosphere or an $HN_x$-atmosphere or argon gas atmosphere or combinations thereof.

In an embodiment, taken together the aluminum base substrate and all layers exterior thereto form a metal filler for a brazing operation and together has a composition comprising at least, by weight percent:

Si in the range of 5 to 14%,
Ni in the range of 0.03 to 8%,
Sn in the range of 0.01 to 7%,
Bi in the range of at most 0.3%,
Sb in the range of at most 0.3%,
Zn in the range of at most 0.3%,
Mg in the range of at most 5%,
balance aluminum and inevitable impurities,
and with the proviso that the mol-ratio of Ni:Sn is in the range of 10:(0.5 to 9), and preferably in the range of 10:(0.5 to 6).

A typical impurity element in the filler metal is iron, in particular originating from the AlSi-alloy substrate or AlSi-alloy clad layer, and which may be tolerated up to about 0.8%. Other alloying elements may be present, and will typically originate from the aluminum base substrate or alternatively the aluminum clad layer. Typically each impurity element is present in a range of not more than 0.05%, and the total of the impurity elements does not exceed 0.3%.

When the mol-ratio is too low no significant effect on the post-braze corrosion life may be found. If the mol-ratio of Ni:Sn becomes more than 10:6, than the brazeability becomes less efficient, while at a mol-ratio of more than 10:9 the brazeability becomes very poor.

Depending on the Ni:Sn ratio applied, the diffusion annealing treatment is to form also a layer comprising nickel on the outersurface of the aluminum base substrate layer and the diffusion layer comprising nickel-tin alloy on the outersurface of the layer comprising nickel. During the diffusion annealing treatment the plated tin diffuses from above into the plated nickel or nickel-alloy layer, thereby leaving part of the underlying nickel layer located close to the clad layer unalloyed. This unalloyed nickel layer, or at least not alloyed with tin, is preferred because it initiates the presumed exothermic reaction, better than an alloyed layer, with the underlying AlSi-alloy during the brazing operation. This reaction does to a significant, although lesser, extent occur, if alloying elements such as tin are present in too high an amount. The diffusion annealed Ni—Sn alloy layer typically has a thickness in the range of about 0.2 to 0.6 μm.

Preferably in the brazing product according to the invention the plated layer comprising nickel or nickel-alloy having 90% or more of nickel, e.g. Ni—Bi, has a thickness of at most 2.0 μm, preferably at most 1.0 μm, and more preferably in the range of 0.05 to 0.5 μm. A coating thickness of more than 2.0 μm requires a prolonged treatment time for plating, and may result in wrinkling of the molten filler metal during a subsequent brazing operation. A preferred minimum thickness for this nickel-containing layer is about 0.25 μm. Also, other techniques such as dipping, thermal spraying, CVD, PVD or other techniques for depositing of metals or metal alloys from a gas or vapor phase may be used. Preferably the nickel comprising layer is essentially lead-free.

In the brazing product according to the invention, the layer comprising tin or tin-alloy having 90% or more of tin, has a thickness prior to the diffusion annealing adjusted to the desired mol-ratio of Ni:Sn. This tin layer is preferably applied by means of plating. But also other techniques such as dipping, thermal spraying, CVD, PVD or other techniques for depositing of metals or metal alloys from a gas or vapor phase may be used.

In an embodiment the brazing product is elongated aluminum alloy stock, e.g. aluminum alloy sheet or strip, aluminum alloy wire or aluminum alloy rod.

In an embodiment the aluminum substrate is made of an AA4xxx-series aluminum alloy sheet or strip having Si as the most important alloying element in the range of 4 to 14% by weight, more preferably 7 to 14%, and can be plated on one or both surfaces with Ni or Ni-alloy, e.g. Ni—Bi alloy, and may be employed in subsequent brazing operations, in particular in an inert atmosphere brazing operation in the absence of a brazing-flux material. In the AA4xxx-series alloy other alloying elements may be present to improve specific properties, such as Mg up to 5%, the balance is made by impurities each up to 0.05 wt. %, total up to 0.25 wt. %, and aluminum. Iron may usually be present as impurity in an amount of up to 0.8 wt. %.

Also, aluminum alloy wire or rods being made of an AA4xxx-series alloy may be plated with a Ni or Ni-alloy layer having 90% or more of nickel, e.g. Ni—Bi alloy, and subsequently employed in a brazing operation, in particular in an inert atmosphere brazing (CAB) operation in the absence of a brazing-flux material, and may also be employed as weld filler wire or weld filler rod in a welding operation.

In an embodiment the aluminum substrate is an aluminum alloy sheet coupled to a core sheet made of an aluminum alloy. In a further embodiment the AlSi-alloy clad layer has a thickness ranging from about 2 to 20% of the total thickness of the total brazing product thickness. Typical aluminum clad layer thickness is in the range of 40 to 80 micron. The aluminum core sheet has a thickness typically in a range of at most 5 mm, more preferably in the range of 0.1 to 2 mm.

In an embodiment the method according to the invention is further characterized by depositing a thin layer comprising zinc as an intermediate bonding layer between the outersurface of the AlSi-alloy layer and the thin layer comprising nickel or nickel-alloy. With the intermediate bonding layer a very effective bond between the AlSi-alloy layer and the thin layer comprising nickel is formed, the bond remaining effective during subsequent deformation of the brazing product, for example in a bending operation. The most suitable methods of applying such an intermediate layer of zinc is by means of direct or immersion plating. Preferably the applied intermediate bonding layer has a thickness of at most 0.5 µm, more preferably at most 0.3 µm (300 nm), and most preferably in the range of 0.01 to 0.15 µm (10-150 nm). In the best results obtained a thickness of about 30 nm has been used. A coating thickness of more than 0.5 µm is thought to have no further advantages for improving the adhesion.

The invention further provides an assembly of components, for example a heat exchanger, typically for automotive applications, or a fuel cell, typically an electrochemical fuel cell, joined by brazing, whereby at least one of the components being a brazing sheet product as set out above or the brazing product obtained by the method set out above. The brazing operation is preferably carried out in an inert atmosphere (CAB) in the absence of a brazing flux material or under a vacuum.

In an embodiment there is provided a brazed assembly wherein at least one of the components to be joined by brazing is made of the brazing sheet product set out above or produced by the method in accordance with the invention described above, and at least one other component is made of steel, aluminized steel, stainless steel, plated or coated stainless steel, bronze, brass, nickel, nickel alloy, titanium, or plated or coated titanium.

BRIEF DESCRIPTION OF THE DRAWING

The invention will now be illustrated by a non-limitative example and with reference to the drawing, wherein.

DETAILED DESCRIPTION OF A PREFERRED EMBODIMENT

Figure 1:
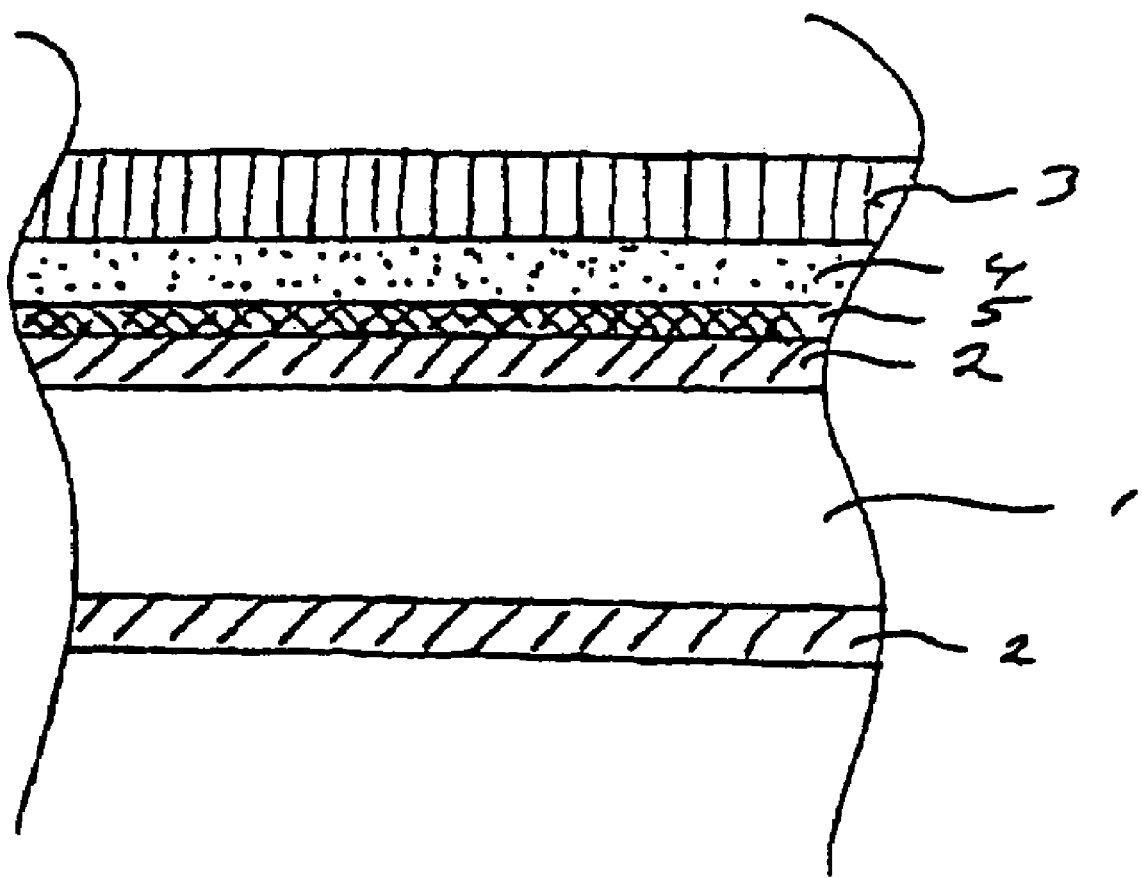
FIG. 1 is a schematic longitudinal section showing the structure of a brazing sheet product according to the invention after a diffusion annealing treatment.

FIG. 1 shows schematically a brazing product, in the present case aluminum brazing sheet, in accordance with the present invention consisting of a core sheet 1 on one or both sides clad with an aluminum clad layer 2 comprising an Al—Si alloy (also known as aluminum base substrate) and the nickel-tin alloy diffusion layer 3 resulting from the diffusion annealing treatment of two separately applied metal layers of nickel or nickel-alloy and tin or tin-alloy, and the layer 4 comprising nickel or nickel-alloy which has not been alloyed as a result of the diffusion annealing treatment, and the optional bonding layer 5 of zinc is applied, the advantages of which are set out above. In FIG. 1 the layers 3, 4 and 5 have been shown on only one side of the brazing sheet, but it will be immediately apparent to the skilled person that they may also be applied on both sides of the brazing sheet product. Thus, if desired, the clad layer 2 shown to only contact the core 1, may be further provided with other layers, e.g. 3 and 4, and optionally also with 5.

EXAMPLE

On a laboratory scale tests were carried out on aluminum brazing sheets manufactured from an AA3003 core alloy roll clad on both sides with an AA4045 clad alloy, and having a total thickness of 0.5 mm and a clad layer thickness of 50 microns on both sides. The following sequential pre-treatment steps have been used for each sample:

cleaning by immersion for 180 sec. at 50° C. in ChemTec 30014 bath (a commercial available bath), followed by rinsing, alkaline etching for 20 sec. at 50° C. in ChemTec 30203 bath (a commercial available bath), followed by rinsing, desmutting for 60 sec. at room temperature in an acidic oxidizing solution, typically 50% nitric acid, followed by rinsing, zincate immersion using ChemTec 19023 bath (a commercial available zincate bath) for 60 sec. at room temperature resulting in a thin zinc layer having a thickness of about 30 nm, followed by rinsing.

Following the above pre-treatment on both sides firstly a nickel layer of 0.5 micron thickness (4.45 g/m$^2$) was applied by means of electroplating, and on top of the applied nickel layer a tin layer was applied also by means of electroplating of various thickness of 0.9, 1.8 and 3.0 g/m$^2$ (see Table 1).

The composition of nickel plating bath was a known Wath-bath comprising:

| | |
|---|---|
| 270 g/l | NiSO$_4$.6H$_2$O |
| 50 g/l | NiCl$_2$.6H$_2$O |
| 30 g/l | H$_3$BO$_3$ |

The tin plating bath was a commercial available Methane Sulfonic Acid ("MSA") bath called RONASTAN (trade mark) supplied by Shipley Ronal, and having the composition:

| | |
|---|---|
| 25 g/l | Sn |
| 60 g/l | MSA of 0.84 M. |
| 3.5 g/l | sulphuric acid |
| 45 ml/l | additive TP |
| 4.5 ml/l | anti-oxidant TP |

Following the plating of the metal layers, the plated brazing sheet product was diffusion annealed for 8 minutes at 250° C. under a protective inert nitrogen atmosphere to form a Ni—Sn diffusion layer. The diffusion annealed panels looked silvery and shiny. Samples of the diffusion-annealed products were analyzed by Glow Discharge Optical Emission Spectroscopy ("GDOES"). The GDOES depth profiles showed that the tin was completely alloyed with the nickel after the diffusion annealing treatment. There was no free tin present anymore. The resulting Ni—Sn alloy diffusion layer was mainly composed of the equilibrium phase Ni3Sn4. Underneath the Ni—Sn alloy diffusion layer there was a tin-free nickel layer of about 0.35 micron thick and having the composition of the originally plated nickel layer prior to the diffusion annealing treatment and had not been alloyed with the tin as result of the diffusion annealing treatment. Repeating the diffusion annealing at 250° C. in open air did not result in the detection of any detrimental oxides.

The plated specimens have been tested for adhesion using the Erichsen dome test (5 mm), and the T-bend test. A value assessment is then given to the adhesion of poor, fair, or good. All samples tested had a good adhesion performance.

For the assessment of the post-braze corrosion resistance, the samples have been subjected to a simulated brazing cycle. The samples were heated under flowing nitrogen, with heating from room temperature to 580° C., dwell time at 580° C. for 2 minutes, cooling from 580° C. to room temperature. All samples had an excellent brazeability. Following the brazing cycle four samples of each type of plated brazing sheet have been tested in a SWAAT until the first perforations expressed in days of testing appear according to ASTM G-85, and the individual results are given in Table 1. The dimensions of the samples for the SWAAT-test were 100 mm×50 mm.

As a reference it is mentioned that typically aluminum brazing sheets manufactured from an AA3003 core alloy clad on both sides with an AA4045 clad alloy, and having a total thickness of 0.5 mm and a clad layer thickness of 50 microns each and devoid of any further metal layers have a SWAAT-test performance of more than 16 days without perforations.

As a further reference material also brazing sheet product (same core and clad layer composition and thickness) with a thin zinc bonding layer and only a NiBi-alloy electroplated layer manufactured according to the example of the international PCT application no. WO-01/88226, J. N. Mooij et al., and incorporated herein by reference, has been tested for its corrosion performance.

For this example all products tested had the same AA3003-series core alloy.

TABLE 1

Post-braze SWAAT-test results.

| Sample no. | Alloy System | Amount of Sn (g/m²) | Atomic-% Sn* | Mol ratio Ni:Sn | Days till first perforation | Average over 4 samples |
|---|---|---|---|---|---|---|
| 1 | NiBi | — | — | — | 4 | |
| 2 | NiBi | — | — | — | 4 | |
| 3 | NiBi | — | — | — | 3 | |
| 4 | NiBi | — | — | — | 4 | 4 |
| 1 | Ni + Sn | 0.9 | 9.1 | 10:1 | 8 | |
| 2 | Ni + Sn | 0.9 | 9.1 | 10:1 | 5 | |
| 3 | Ni + Sn | 0.9 | 9.1 | 10:1 | 5 | |
| 4 | Ni + Sn | 0.9 | 9.1 | 10:1 | 6 | 6 |
| 1 | Ni + Sn | 1.8 | 16.7 | 10:2 | 7 | |
| 2 | Ni + Sn | 1.8 | 16.7 | 10:2 | 7 | |
| 3 | Ni + Sn | 1.8 | 16.7 | 10:2 | 7 | |
| 4 | Ni + Sn | 1.8 | 16.7 | 10:2 | 8 | 7 |
| 1 | Ni + Sn | 3.0 | 25.0 | 10:3.33 | 8 | |
| 2 | Ni + Sn | 3.0 | 25.0 | 10:3.33 | 7 | |
| 3 | Ni + Sn | 3.0 | 25.0 | 10:3.33 | 8 | |
| 4 | Ni + Sn | 3.0 | 25.0 | 10:3.33 | 10 | 8 |

*atomic percent tin is the atomic percent of the tin relative to the combined total of the tin of the applied tin layer and nickel of the applied nickel layer.

From the results of Table 1 it can be seen that a brazing sheet product known from the prior art and having a layer consisting of nickel with a small addition of bismuth as an alloying element has an average SWAAT-test result of 4 days. The application of a tin layer in an amount in accordance and after diffusion annealing in accordance with the invention results in a significant increase of the SWAAT-test performance, while maintaining a good adhesion performance and an excellent brazing performance. By increasing the amount of tin with respect to the amount of nickel an improved SWAAT-test performance is obtained. Tin may also reduce the surface tension of the molten metal filler during the brazing cycle and thereby improves the flowability of the molten filler metal. The amount of tin to improve on the post-braze corrosion performance is by far sufficient to overcome the need for the addition of bismuth or antimony or magnesium or lead added for the same purpose of reducing the surface tension. The combined addition of Sn with Bi and/or Sb and/or Mg and/or Pb remains still possible.

Having now fully described the invention, it will be apparent to one of ordinary skill in the art that many changes and modifications can be made without departing from the spirit or scope of the invention as hereon described.

The invention claimed is:

1. A brazing sheet product comprising
   a core sheet,
   on at least one side of said core sheet a clad layer made of an aluminum alloy containing silicon in an amount in the range of 4 to 14% by weight, and
   on at least one outersurface of said clad layer a diffusion layer comprising nickel-tin alloy,
   wherein there is a layer comprising nickel or nickel-alloy between the outersurface of said clad layer and the diffusion layer.

2. A brazing sheet product according to claim 1, wherein the layer comprising nickel or nickel-alloy has a thickness of at most 0.4 micron.

3. A brazing sheet product according to claim 1, wherein the layer comprising nickel comprises 96% by weight or more of nickel and bismuth in a range up to 4% by weight.

4. A brazing sheet product according to claim 1, wherein the diffusion layer has a thickness in a range of about 0.2 to 0.6 micron.

5. A brazing sheet product according to claim 1, wherein there is a layer comprising zinc as a bonding layer between said outersurface of said clad layer and said layer comprising nickel.

6. A brazing sheet product according to claim 5, wherein said bonding layer has a thickness of not more than 0.5 micron.

7. A brazing sheet product according to claim 5, wherein said bonding layer has a thickness of not more than 0.3 micron.

8. A brazing sheet product according to claim 5, wherein said bonding layer has a thickness in the range of 0.01 to 0.15 micron.

9. A brazing sheet product according to claim 1, wherein the core sheet is made of an aluminum alloy.

10. A brazing sheet product according to claim 1, wherein the core sheet is made of an aluminum alloy selected from the group consisting of AA3xxx, AA5xxx and AA6xxx-series alloys.

11. A brazing sheet product according to claim 1, wherein the clad layer and all layers exterior thereto form a metal filler for a brazing operation and having a composition with the proviso that the mol-ratio of Ni:Sn is in the range of 10:(0.5 to 9).

12. A brazing sheet product according to claim 1, wherein the clad layer and all layers exterior thereto form a metal filler for a brazing operation and having a composition with the proviso that the mol-ratio of Ni:Sn is in the range of 10:(0.5 to 6).

13. A brazing sheet product according to claim 1, wherein taken together the aluminum base substrate of an aluminum alloy comprising silicon in an amount in the range of 4 to 14% by weight and all layers exterior thereto form a metal filler for a brazing operation and having a composition comprising at least, by weight percent:
Si in the range of 5 to 14%,
Ni in the range of 0.03 to 8%,
Bi in the range of at most 0.3%,
Sb in the range of at most 0.3%,
Sn in the range of 0.01 to 7%,
Zn in the range of at most 0.3%,
Mg in the range of at most 5%,
balance aluminum and inevitable impurities, with the proviso that the mol-ratio of Ni:Sn is in the range of 10:(0.5 to 9).

14. A brazing sheet product according to claim 1, wherein the brazing sheet product has a post-braze corrosion life of 7 days or more in a SWAAT-test with perforations in accordance with ASTM G-85.

15. An assembly of components joined by brazing, and wherein at least one of said components being a brazing sheet product according to claim 1.

16. An assembly according to claim 15, wherein the components are joined by means of a brazing operation in an inert atmosphere in the absence of a brazing flux material.

17. An assembly according to claim 15, wherein the components are joined by means of a brazing operation using a vacuum.

18. An assembly according to claim 15, wherein parts made from said brazing sheet product have a post-braze corrosion life of 6 days or more in a SWAAT-test without perforations in accordance with ASTM G-85.

19. An assembly according to claim 15, wherein at least one other of said components comprises a material selected from the group consisting of steel, aluminized steel, stainless steel, plated or coated steel, plated or coated stainless steel, bronze, brass, nickel, nickel alloy, titanium, and plated or coated titanium.

20. An assembly according to claim 15, wherein the assembly is a heat exchanger for automotive application.

21. An assembly according to claim 15, wherein the assembly is a fuel cell.

22. An assembly according to claim 15, wherein the assembly is an electrochemical fuel cell.

23. A method of manufacturing a brazing sheet product comprising:
a core sheet,
on at least one side of said core sheet a clad layer made of an aluminum alloy containing silicon in an amount in the range of 4 to 14% by weight, and
on at least one outersurface of said clad layer a diffusion layer comprising nickel-tin alloy,
wherein there is a layer comprising nickel or nickel-alloy between the outersurface of said clad layer and the diffusion layer which method comprises the steps of:
(a) providing an aluminum base substrate layer comprising the clad layer made of an aluminum alloy comprising silicon in an amount in the range of 4 to 14% by weight coupled to the core sheet,
(b) applying a metal layer comprising nickel or nickel-alloy onto at least one outersurface of said of said aluminum base substrate,
(c) applying a metal layer comprising tin or tin-alloy onto the outersurface of the layer comprising nickel or nickel-alloy, and
(d) subject the coated brazing product to a diffusion annealing treatment by holding the plate brazing product at a temperature in the range of 100 to 500° C. for a peroid of 1 sec. to 300 minutes to form the diffusion layer comprising nickel-tin alloy.

24. A method according to claim 23, wherein the metal layer comprising nickel or nickel-alloy is applied using a plating method.

25. A method according to claim 23, wherein the metal layer comprising nickel or nickel-alloy is applied using an electrolytic plating method.

26. A method according to claim 23, wherein metal layer comprising nickel or nickel-alloy is applied using a PVD method.

27. A method according to claim 23, wherein metal layer comprising nickel or nickel-alloy is applied using a CVD method.

28. A method according to claim 23, wherein metal layer comprising nickel or nickel-alloy is applied using a thermal spraying method.

29. A method according to claim 23, wherein the metal layer comprising tin or tin-alloy is applied using a plating method.

30. A method according to claim 23, wherein the metal layer comprising tin or tin-alloy is applied using an electrolytic plating method.

31. A method according to claim 23, wherein metal layer comprising tin or tin-alloy is applied using a PVD method.

32. A method according to claim 23, wherein metal layer comprising tin or tin-alloy is applied using a CVD method.

33. A method according to claim 23, wherein metal layer comprising tin or tin-alloy is applied using a thermal spraying method.

34. A method according to claim 23, wherein the diffusion annealing treatment is carried out in a protective atmosphere.

35. A method according to claim 23, wherein the diffusion annealing treatment is carried out in a temperature range of 230 to 350° C.

36. A method according to claim 23, wherein the diffusion annealing treatment is carried out in a temperature range of 230 to 350° C. for said period, said period being in the range of 1 to 600 sec.

37. A method according to claim 23, wherein the diffusion annealing treatment is carried out in a temperature range of 230 to 350° C. for said period, said period being in the range of 1 to 300 sec.

38. A method according to claim 23, wherein the clad layer and all layers exterior thereto form a metal filler for a brazing operation and having a composition with the proviso that the mol-ratio of Ni:Sn is in the range of 10:(0.5 to 9).

39. A method according to claim 23, wherein the clad layer and all layers exterior thereto form a metal filler for a brazing operation and having a composition with the proviso that the mol-ratio of Ni:Sn is in the range of 10:(0.5 to 6).

40. A method according to claim 23, wherein taken together the aluminum base substrate of an aluminum alloy comprising silicon in an amount in the range of 4 to 14% by weight and all layers exterior thereto form a metal filler for a brazing operation and having a composition comprising at least, by weight percent:

Si in the range of 5 to 14%,
Ni in the range of 0.03 to 8%,
Bi in the range of at most 0.3%,
Sb in the range of at most 0.3%,
Sn in the range of 0.01 to 7%,
Zn in the range of at most 0.3%,
Mg in the range of at most 5%, balance aluminum and inevitable impurities, with the proviso that the mol-ratio of Ni:Sn is in the range of 10:0.5 to 9.

41. A method according to claim 40, wherein the mol-ratio of Ni:Sn is in the range of 10:(0.5 to 6).

42. A method according to claim 23, wherein the aluminum base substrate is made of an AA4000-series aluminum alloy.

43. A method according to claim 23, wherein the core sheet is made of an aluminum alloy.

44. A method according to claim 43, wherein the core sheet is made of an aluminum alloy selected from the group consisting of AA3xxx, AA5xxx and AA6xxx-series alloys.

45. A method according to claim 43, wherein the aluminum clad layer is made of an AA4xxx-series aluminum alloy.

46. A method according to claim 23, wherein prior to plating according to step (b), there is deposited onto the outersurface of the aluminum substrate a bonding layer comprising zinc.

47. A method according to claim 23, wherein prior to plating according to step (b), there is deposited onto the outersurface of the aluminum substrate a bonding layer comprising zinc said bonding layer having a thickness of not more than 0.5 micron.

48. A method according to claim 23, wherein prior to plating according to step (b), there is deposited onto the outersurface of the aluminum substrate a bonding layer comprising zinc said bonding layer having a thickness of not more than 0.3 micron.

49. A method according to claim 23, wherein the diffusion layer has a thickness in the range of about 0.2 to 0.6 micron.

* * * * *